United States Patent [19]

Ko et al.

[11] 4,049,634
[45] Sept. 20, 1977

[54] IN-AIR CURABLE RESIN COMPOSITIONS

[75] Inventors: Keiun Ko, Minoo; Naomitsu Takashina; Shigeru Shiokawa, both of Fujisawa; Rokuro Fujita, Chigasaki, all of Japan

[73] Assignee: Mitsubishi Gas Chemical Company, Inc., Japan

[21] Appl. No.: 598,941

[22] Filed: July 25, 1975

[30] Foreign Application Priority Data

July 31, 1974 Japan .................. 49-87086

[51] Int. Cl.² .................. C08L 63/00; C08G 63/12
[52] U.S. Cl. .................. 260/75 UA; 260/26; 260/27 R; 260/37 EP; 260/37 N; 260/40 R; 260/42.28; 260/77.5 CR; 260/78 UA; 260/827; 260/830 TW; 260/835; 260/836; 260/837 R; 260/842; 260/844; 260/851; 260/856; 260/857 UN; 260/858; 260/859 R; 260/861; 260/862; 204/159.16; 204/159.22; 204/159.23; 526/320
[58] Field of Search .............. 260/75 UA, 837 R, 835; 526/320

[56] References Cited

U.S. PATENT DOCUMENTS

| 2,891,093 | 6/1959 | Hurdis | 526/320 |
|---|---|---|---|
| 2,928,804 | 3/1960 | Foster | 526/320 |
| 3,345,401 | 10/1967 | May | 526/320 |
| 3,621,093 | 11/1971 | Svoboda | 264/331 |
| 3,631,154 | 12/1971 | Kawaguchi | 260/75 UA |
| 3,751,399 | 8/1973 | Lee | 526/320 |
| 3,754,054 | 8/1973 | Kimura | 526/320 |
| 3,770,702 | 11/1973 | Roper | 526/320 |
| 3,793,398 | 2/1974 | Hokamura | 260/835 |
| 3,825,517 | 7/1974 | Ficarra | 260/835 |
| 3,882,187 | 5/1975 | Takiyama | 260/835 |
| 3,925,322 | 12/1975 | Azuma | 260/75 UA |
| 3,935,173 | 1/1976 | Ogasawara | 260/75 UA |
| 3,968,016 | 7/1976 | Wismer | 260/837 |

FOREIGN PATENT DOCUMENTS 46-42372  12/1971  Japan .................. 526/320

Primary Examiner—Paul Lieberman
Attorney, Agent, or Firm—Wenderoth, Lind & Ponack

[57] ABSTRACT

A resin composition curable in air comprising (A) an unsaturated oligomer having a number average molecular weight of 500 to 4,000 and containing at least two acryloyl and/or methacryloyl groups at the ends of the molecule and at least one ethylenic internal double bond in the oligomer chain and (B) an oligomer having a number average molecular weight of 500 to 4,000 which contains at least two acryloyl and/or methacryloyl groups at the ends of the molecule and at least one pendant allyloxy groups in the oligomer chain with an allyloxy equivalent of not more than 500, and is free from an ethylenic internal double bond in the oligomer chain. The composition is especially useful as a solventless coating agent.

18 Claims, No Drawings

IN-AIR CURABLE RESIN COMPOSITIONS

This invention relates to an "in-air" curable resin composition, and more specifically, to a resin composition comprising a combination of an oligomer containing an acryloyl or methacryloyl group and an ethylenic internal double bond and an oligomer containing an acryloyl or methacryloyl group and an allyloxy group but being free from an ethylenic internal double bond, which has the property of being easily cured in air, and is especially useful as a "solventless" coating composition.

Conventional curable compositions containing a cross-linkable acryloyl or methacryloyl group have found much use in anaerobic adhesives, coating materials or sealants which cure in the absence of air. It is technically difficult, however, to cure them in the complete absence of air. When curing is performed while shutting off air incompletely, the surface exposed to oxygen, under the polymerization-inhibiting action of oxygen, is either not polymerized at all, or polymerized insufficiently to leave tackiness, and satisfactory cured products cannot be obtained. The polymerization-inhibiting action of oxygen is high especially when the curable composition is coated in the form of a thin film and cured.

Many attempts have heretofore been made to avoid such a polymerization-inhibiting action of oxygen in coating materials. They include, for example, a method which comprises curing them in an atmosphere of an inert gas such as nitrogen or carbon dioxide, a method which involves shutting off air by covering the surface with a thin, air-impermeable film, a method in which wax is incorporated in the curable composition so that after coating, the wax may come out on the surface as a thin layer, and the coated composition is cured while shutting off air by this thin layer, and a method in which an unsaturated polyester resin modified with a special functional group such as an allyloxy, benzyloxy or tetrahydrophthaloyl group that acts as an oxygen-scavenger is incorporated in the curable composition, and it is cured in air.

These conventional methods are still unsatisfactory in many respects. For example, the methods involving the convering of the surface with an air-impermeable film, or the replacement of the atmosphere by an inert gas at the time of curing require specially designed curing apparatuses, and are difficult to perform industrially. In addition, these methods lead to a high cost of production. The method involving the addition of wax requires the strict selection of the type of the wax and the strict conditions for adding it, and the resulting coating is either delustered or half delustered. In order to obtain a glossy surface, polishing is required after curing. Furthermore, since the wax has good solubility in the curable composition, it remains inside the coating after the curing of the coating and reduces its transparency and adhesion to the adhered. Curable compositions containing the modified unsaturated polyester resin can remove the above defects to an apparently satisfactory extent, but the modifying of these compositions with other functional groups, polymers or oligomers in an attempt to improve the properties of the cured product is exceedingly restricted by the special functional groups mentioned above. Thus, fully satisfactory cured products cannot be obtained therefrom.

Since such anaerobic curable compositions require special techniques in order to shut off air, investigations have been made to render compositions based on such an acryloyl or methacryloyl group-containing oligomer curable in air. However, to date, no resin composition, especially coating resin composition, capable of being cured easily in air by radical polymerization using a catalyst has been developed which will afford cured films having superior properties, especially solvent resistance and weather resistance.

It is an object of this invention, therefore, to provide a curable resin composition consisting principally of an acryloyl or methacryloyl group-containing oligomer, which can be cured easily and rapidly even in air.

Another object of this invention is to provide a solventless coating composition comprising the above in-air curable resin composition.

Other objects and advantages of this invention will become apparent from the following description.

We have found that a resin composition comprising a combination of an unsaturated oligomer containing an acryloyl or methacryloyl group and an ethylenic internal double bond and an oligomer containing an acryloyl or methacryloyl group and an allyloxy group has the property of being cured fully rapidly even in air and the workability of being coated directly on a substrate without a solvent, and that this resin composition affords cured products having satisfactory chemical and physical properties, especially solvent resistance, weather resistance and surface smoothness.

According to this invention, there is provided an in-air curable resin composition comprising A. an unsaturated oligomer having a number average molecular weight of 500 to 4,000 and containing at least two groups selected from the class consisting of acryloyl and methacryloyl groups at the ends of the molecule and at least one ethylenic internal double bond in the oligomer chain, and B. an oligomer having a number average molecular weight of 500 to 4,000 which contains at least two groups selected from the class consisting of acryloyl and methacryloyl groups at the ends of the molecule and at least one pendant allyloxy group in the oligomer chain with the allyloxy group equivalent being not in excess of 500, and which is free from an ethylenic internal double bond.

The type of the unsaturated ologomer (A) is not strictly limited, but can be chosen from a wide range of oligomers so long as it contains at least two groups selected from the class consisting of acryloyl and methacryloyl groups and at least one ethylenic internal double bond and has a number average molecular weight of 500 to 4,000, preferably 600 to 3,000, more preferably 700 to 2,500.

The term "ethylenic internal double bond", used herein, denotes a radical-polymerizable carbon-to-carbon double bond present in the oligomer chain, and the "number average molecular weight", used herein, means a value measured by a vapor pressure osmometer (VPO for short).

Oligomers that can be used conveniently as the unsaturated oligomer (A) in the present invention are those in which the ethylenic internal double bond is introduced into the molecule based on an acryl structural unit derived from an ethylenically unsaturated polycarboxylic acid. These unsaturated oligomers (A) contain at least two of acryloyl groups, or methacryloyl groups, or both of these. There is no critical restriction to the upper limit of the number of such acryloyl and methacryloyl groups, and it can be varied according to the use of the resin composition and the type of the oligomer, etc. Generally, however, the number of these groups is up to 10, preferably 2 to 6.

The number of the ethylenic internal double bonds that can be included in the unsaturated oligomer (A) is usually up to 15, preferably 2 to 10.

Preferred species of the unsaturated oligomer (A) that can be used to prepare the composition of this invention have a structure of the following formula

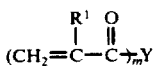

(I)

wherein $R^1$ is a hydrogen atom or a methyl group, Y is an unsaturated oligomer residue containing up to 15 acyl structural units derived from an ethylenically unsaturated polycarboxylic acid, and m is a number of at least 2, preferably 2 to 6.

The unsaturated oligomer residue Y in the above general formula (I) involves an acyl structural unit derived from an ethylenically unsaturated polycarboxylic acid, preferably in the form of an ester, an amide or a combination of these. Furthermore, the residue Y may be a residue of a polyol, a polycarboxylic acid, a polyamine, a polyisocyanate, or a polyepoxide. This unsaturated oligomer residue Y is derived from an unsaturated oligomer of various monomers bonded to each other through an ether linkage (—O—), ether linkage (—COO—), urethane linkage (—NHCOO—), urea linkage (—NHCONH—), or amide linkage (—CONH—).

An unsaturated oligoester residue or oligoamide residue is especially preferred as the unsaturated oligomer residue in formula (I).

The ethylenically unsaturated polycarboxylic acid that is used in this invention is an aliphatic or alicyclic organic unsaturated polybasic acid containing in the molecule at least one ethylenic double bond, preferably only one such bond, and at least two carboxyl groups (—COOH), preferably two carboxyl groups, preferably containing 4 to 10 carbon atoms. Examples of the polycarboxylic acid are maleic acid, maleic anhydride, fumaric acid, itaconic acid, tetrahydrophthalic acid, 3,6-endomethylene-Δ⁴-tetrahydrophthalic anhydride, and hexachloro-3,6-endomethylene-Δ⁴-tetrahydrophthalic anhydride.

The unsaturated oligomer (A) may contain only one, or two or more, kinds of acyl structural units derived from these polycarboxylic acids, and the acyl structural units can generally be present in the form of an ester or amide in the unsaturated oligomer (A).

Accordingly, the unsaturated oligomers of formula (I) which can be suitably used in this invention specially include unsaturated oligoester acrylates or methacrylates and unsaturated oligoamide acrylates or methacrylates having a number average molecular weight of 500 to 4,000, preferably 600 to 3,000, more preferably 700 to 2,500.

The unsaturated oligoester acrylates or methacrylates having molecular weights within the above specified range can be easily prepared, for example, by reacting hydroxyl group-terminated unsaturated oligoesters (to be referred to hereinbelow as unsaturated oligoester polyols), carboxyl group-terminated unsaturated oligoesters (to be referred to hereinbelow as unsaturated oligoester polycarboxylic acids) or epoxy group-terminated unsaturated oligoesters (to be referred to hereinbelow as unsaturated oligoester polyepoxides) with acrylic acid or methacrylic acid or reactive derivatives thereof (e.g., halides or esters). For example, when an unsaturated oligoester polyol is used as a starting material, the desired unsaturated oligomer can be easily obtained by reacting it with an acrylic acid halide, a methacrylic acid halide, or an epoxy ester of acrylic acid or methacrylic acid (for example, glycidyl acrylate or glycidyl methacrylate) in stoichiometrical amounts, as schematically shown below, optionally using a catalyst, for example, a tertiary amine such as dimethylaniline or pyridine when the halide is used.

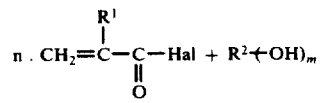

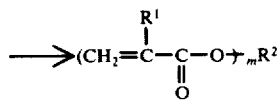

(A)

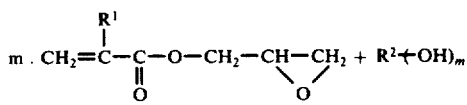

(B)

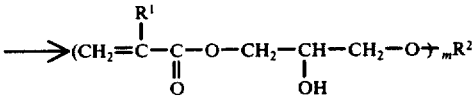

In the above scheme, $R^1$ and m are the same as defined above, $R^2$ is a residue of an unsaturated oligoester polyol, and Hal is a halogen atom.

In order to convert the unsaturated oligoester polycarboxylic acid or unsaturated oligoester polyepoxide to the unsaturated oligoester acrylate or methacrylate, the unsaturated oligoester polycarboxylic acid or unsaturated oligoester polyepoxide is reacted with the hydroxyl group-containing acrylate or methacrylate or the epoxy ester of acrylic acid or methacrylic acid in the presence, if desired, of a known esterification catalyst, as schematically shown below. Examples of the hydroxyl group-containing acrylates or methacrylates are 2-hydroxyethyl acrylate, 2-hydroxyethyl methacrylate, 2-hydroxypropyl acrylate, and polyethylene glycol monoacrylate.

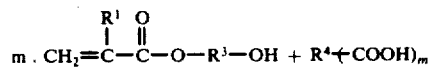

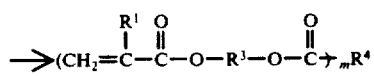

(C)

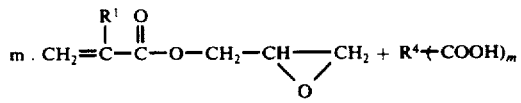

(D)

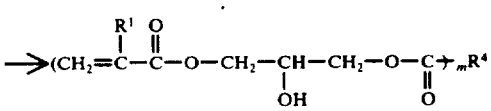

-continued

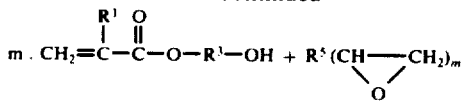

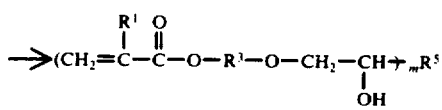 (E)

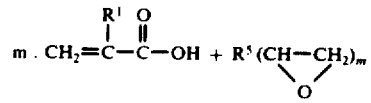

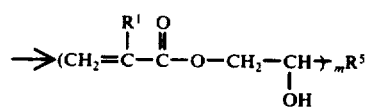 (F)

In the above scheme, R¹ and m are the same as defined above, R³ is an alkylene or polyalkyleneoxy group, R⁴ is an unsaturated oligoester polycarboxylic acid residue, and R⁵ is an unsaturated oligoester polyepoxide residue.

The unsaturated oligoester acrylate or methacrylate can also be prepared by reacting the unsaturated oligoester polyol with a polyisocyanate compound to form an isocyanate group terminated unsaturated oligoester (to be referred to hereinbelow as unsaturated oligoester urethane polyisocyanate), and then reacting the resulting unsaturated oligoester urethane polyisocyanate with the hydroxyl group containing acrylate or methacrylate or acrylic or methacrylic acid, as schematically shown below.

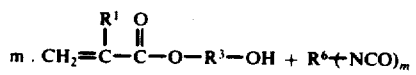

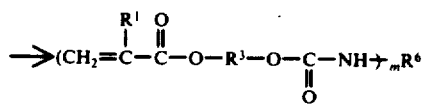 (G)

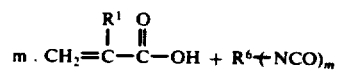

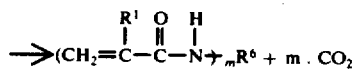 (H)

In the above scheme, R¹, R³ and m are the same as defined above, and R⁶ represents a residue of an unsaturated oligoester urethane polyisocyanate.

Examples of the polyisocyanate compound used in the above reaction are tolylene diisocyanate, xylylene diisocyanate, hexamethylene diisocyanate, and 4,4'-diphenylmethane diisocyanate. Preferably, the polyisocyanate compound is used in an amount at least the equivalent to the hydroxyl group of the unsaturated oligoester polyol. The hydroxyl group-containing acrylate or methacrylate or acrylic or methacrylic acid is reacted substantially in a stoichiometrical amount with the unsaturated oligoester urethane polyisocyanate.

The unsaturated oligoester polyol, unsaturated oligoester polycarboxylic acid or unsaturated oligoester polyepoxide that can be used in the manufacture of the above unsaturated oligoester acrylate or methacrylate can be prepared, for example, by stepwise condensation of the ethylenically unsaturated polycarboxylic acid mentioned above and a polyhydric alcohol or polyepoxide in a manner known per se as disclosed in Synthesis Examples until the desired molecular weight is obtained. When the polycarboxylic acid component is used in excess, the unsaturated oligoester polycarboxylic acid is obtained. When the polyhydric alcohol or polyepoxide is used in excess, the unsaturated oligoester polyol or unsaturated oligoester polyepoxide is obtained.

The ethylenically unsaturated polycarboxylic acid used to form the unsaturated oligoester polyol, polycarboxylic acid or polyepoxide (they may be referred to generically as unsaturated oligoester) is as exemplified above, and can be used either alone or in combination with an aliphatic, aromatic or alicyclic polycarboxylic acid not containing an ethylenic unsaturated double bond preferably containing 4 to 18 carbon atoms, such as phthalic acid, isophthalic acid, terephthalic acid, hexahydroterephthalic acid, adipic acid, sebacic acid, pyromellitic acid or trimellitic acid, or an anhydride of any of these polycarboxylic acids. When the polycarboxylic acid not containing an ethylenic unsaturated double bond is used in combination with the ethylenically unsaturated polycarboxylic acid, 50 to 100 mole%, based on the entire acid component, of the ethylenically unsaturated polycarboxylic acid is introduced so that at least one acyl structural unit derived from the ethylenically unsaturated polycarboxylic acid is introduced into the unsaturated oligoester.

The polyhydric alcohols used to form the unsaturated oligoester polyol are aliphatic, alicyclic or aromatic alcohols containing 2 to 6 hydroxyl groups and 2 to 15 carbon atoms, and include, for example, ethylene glycol, propylene glycol, 1,4-butanediol, 1,6-hexanediol, glycerin, trimethylol propane, pentaerythritol, sorbitol, neopentyl glycol, xylylene glycol, 1,3-bis(hydroxymethyl) cyclohexane, hydrogenated bisphenol A, and 4,4'-dihydroxydicyclohexylmethane, and ether-type polyhydric alcohols containing about 4 to 20 carbon atoms such as diethylene glycol, triethylene glycol, tetraethylene glycol, polyethylene glycol, and polypropylene glycol. These alcohols are used either alone or in admixture with each other. There can also be used diethanolamine, and adducts formed between acetive hydrogen-containing compounds such as the polyhydric alcohols exemplified above or amines and alkylene oxides such as ethylene oxide.

Examples of the polyepoxides that can be used to form the unsaturated oligoester polyepoxide are epoxide compounds having a 2 to 6 glycidyl groups and containing 6 to 30 carbon atoms, such as glycerin diglycidyl ether, phthalic acid diglycidyl ether, bisphenol A diglycidyl ether, ethylene glycol diglycidyl ether, diethylene glycol diglycidyl ether, triethylene glycol diglycidyl ether, tetraethylene glycol diglycidyl ether, propylene glycol diglycidyl ether, 1,3-butylene glycol diglycidyl ether, 1,4-butanediol diglycidyl ether, 1,6-hexanediol diglycidyl ether, trimethylol propane diglycidyl ether, trimethylol propane triglycidyl ether, pentaerythritol diglycidyl ether, pentaerythritol triglycidyl ether, pentaerythritol tetraglycidyl ether, sorbitol diglycidyl ether, neopentyl glycol diglycidyl ether, and xylylene glycol diglycidyl ether.

The unsaturated oligoester acrylates or methacrylates are most suitable as the unsaturated oligomer (A). Unsaturated oligoamide acrylates or methacrylates can also be used advantageously.

The unsaturated oligoamide acrylates or methacrylates can be easily prepared, for example, by reacting an isocyanateterminated unsaturated oligoamide (to be referred to hereinbelow as an unsaturated oligoamide polyisocyanate), an amino-terminated unsaturated oligoamide (to be referred to hereinbelow as an unsaturated oligoamide polyamine) or a carboxyl-terminated unsaturated oligoamide (to be referred to as an unsaturated oligoamide polycarboxylic acid) with acrylic or methacrylic acid or a reactive derivative of such an acid (for example, esters).

An acryloyl or methacryloyl group can be introduced into the unsaturated oligoamide polyisocyanate or unsaturated oligoamide polycarboxylic acid in the same way as mentioned above with regard to the introduction of an acryloyl or methacryloyl group into the unsaturated oligoester urethane polyisocyanate or the unsaturated oligoester polycarboxylic acid. The introduction of an acryloyl or methacryloyl group into the unsaturated oligoamide polyamine can be accomplished by reacting the polyamine directly with acrylic acid or methacrylic acid or with a reactive derivative of acrylic or methacrylic acid (for example, halides), as schematically shown below.

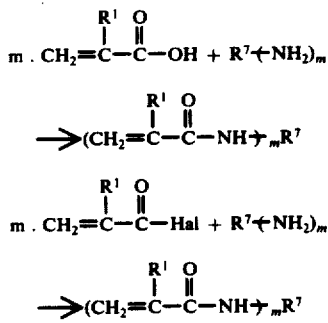

In the above scheme, $R^1$ and m are the same as defined above, and $R^7$ is a residue of an unsaturated oligoamide polyamine.

The unsaturated oligoamide polyisocyanate, oligoamide polycarboxylic acid or oligoamide polyamine (they may be referred to hereinbelow generically as an unsaturated oligoamide) can be easily prepared in a manner known per se by oligo-condensing the ethylenically unsaturated polycarboxylic acid and a polyisocyanate or polyamine.

The polyisocyanate to be used can be selected from those exemplified above. Examples of the polyamine are ethylenediamine, hexamethylenediamine, p-xylylenediamine, hexahydro-p-xylylenediamine, and hexahydro-m-xylylenediamine.

Similarly to what has been stated with regard to the unsaturated oligoesters, a part of the above ethylenically unsaturated polycarboxylic acid can be replaced by a polycarboxylic acid not containing an ethylenic unsaturated double bond as exemplified hereinabove.

The unsaturated oligoester amide can also be formed by linking to each other the ester intermediate and amide intermediate formed during the preparation of the above-mentioned unsaturated oligoester or unsaturated oligoamide, through, for example, a bis-epoxy compound such as glycerine diglycidyl ether, phthalic acid diglycidyl ether, or bisphenol A diglycidyl ether.

The unsaturated oligomers containing an acryloyl or methacryloyl group disclosed in Japanese Laid-Open Patent Applications Nos. 60787/73, 66679/73, 54029/73, and 28692/74 can also be used as the unsaturated oligomer (A) in accordance with this invention.

In preparing the composition of this invention, the above mentioned unsaturated oligoester acrylates or methacrylates or unsaturated oligoamide acrylates or methacrylates can be used either alone or as admixture with each other.

In order that as a combination with the oligomer (B) the resulting composition has ready curability and affords cured products having superior properties such as weather-resistance, solvent resistance and surface smoothness, the unsaturated oligomer (A) should contain at least two acryloyl or methacryloyl groups and at least one ethylenic internal double bond per molecule. Resin compositions not containing the oligomer (A) merely give cured products having poor solvent resistance or weather resistance whose degree of curing is very incomplete. It is also important that the unsaturated oligomer (A) has a number average molecular weight of 500 to 4,000. When the number average molecular weight exceeds 4,000, the viscosity of the resin composition becomes extremely high or the composition becomes solids. Therefore, the resin composition is difficult to use as a solventless coating composition, and is not desirable in view of the purpose of this invention of providing solventless coating compositions and also of coating workability. On the other hand, when the number average molecular weight is less than 500, the molecular weight of the final cross-linked polymer is generally low, and the mechanical properties of the cured product are deteriorated. When the number of acryloyl or methacryloyl groups in the molecule is too large, gellation tends to occur at an early stage during synthesis or storage. Accordingly, the number of such groups should be selected within a range of not more than 10, preferably not more than 6 according to the type of the constituent monomers. Free hydroxyl and carboxyl groups may be present in the unsaturated oligomer (A). Generally, however, when the composition of this invention is to be used as a solventless coating composition, the oligomer desirably has a hydroxyl number of less than 2 and an acid number of less than 2. When the resin composition of this invention is used as an electrodeposition coating composition in the form of an aqueous solution, an emulsion or an aqueous dispersion, the unsaturated oligomer (A) may have an acid number of 35 to 65 by positively leaving carboxyl groups therein.

The important feature of the composition of this invention is to provide a resin composition curable in air by using an acrylic or methacrylic oligomer (B) containing an allyloxy group but not containing an internal double bond in combination with the acrylic or methacrylic oligomer (A) containing an ethylenic internal double bond. The oligomer (B) contains at least 2, generally up to 10, preferably 2 to 6, acryloyl or methacryloyl groups per molecule and at least one, usually up to 15, and preferably 2 to 10, allyloxy groups and has a number average molecular weight of 500 to 4,000, preferably 600 to 3,000, and more preferably 700 to 2,500, the allyloxy equivalent not exceeding 500, and preferably being 200 to 450. There is no particular restriction on the type of the base oligomer constituting the oligomer (B), and a wide range of oligomers can be used.

The term "allyloxy group equivalent" as used in the present application, denotes the molecular weight of an oligomer containing one allyloxy group. For example, when an oligomer having a number average molecular weight of 2,000 contains 4 allyloxy groups, the allyloxy group equivalent is 2,000/4, namely 500.

Useful oligomers (B) are preferably the same in kind as the oligomers (A) except that the ethylenic internal double bond is not present, but an allyloxy group is contained.

Suitable oligomers (B) are those having the following structure.

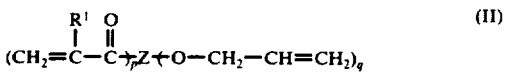
(II)

wherein $R^1$ is a hydrogen atom or a methyl group, Z represents a residue of an oligomer not containing an ethylenic internal double bond, p is a number of at least 2, preferably up to 10, and q is a number of at least one, preferably up to 15.

The oligomer residue Z in formula (II) may be the same as the oligomer residue Y defined in formula (I) on condition that it does not contain an ethylenic double bond. In other words, it can be a residue of a polyol, polyamine, polyisocyanate, polyepoxide or polycarboxylic acid, and is derived from an oligomer of various monomers linked to each other through an ether linkage, ester linkage, urethane linkage, urea linkage, amide linkage or a mixture of these. Preferably, the oligomer residue Z is an oligoester residue and an oligoamide residue. The former is especially preferred.

The oligoester residue and oligoamide residue can be prepared in a manner known per se by oligo-condensing at least one of polycarboxylic acids not containing an ethylenic unsaturated double bond for example, the aliphatic, aromatic or alicyclic polycarboxylic acids or their anhydrides not containing an ethylenic unsaturated double bond as exemplified above with a polyhydric alcohol, polyepoxide, polyamine or polyisocyanate compound. By replacing a part or the whole of the polyhydric alcohol, polyepoxide, polyamine or polyisocyanate compound by an allyloxy group-containing polyhydric alcohol, polyepoxide, polyamine or polyisocyanate, an allyloxy group can be introduced into the oligomer. Suitably, polyhydric alcohols or polyepoxides containing allyloxy groups are used in this invention.

Useful allyloxy group-containing polyhydric alcohols are, for example, compounds of the following formula

(II)

wherein U represents a hydrocarbon group, especially aliphatic hydrocarbon group, being free from an ethylenic unsaturated double bond and preferably containing 3 to 12 carbon atoms, n is an integer of at least 2, preferably up to 6, more preferably 2 to 4, and r is an integer of at least one, preferably not more than 4.

Specific examples of the allyloxy group-containing polyhydric alcohol are glycerol monoallyl ether, trimethylol ethane monoallyl ether, trimethylol propane monoallyl ether, trimethylol propane diallyl ether, pentaerythritol monoallyl ether, pentaerythritol diallyl ether, and mannitol diallyl ether.

The allyloxy group-containing polyepoxide especially includes compounds of the following formula

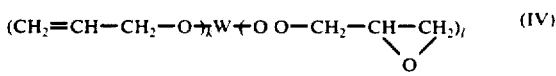
(IV)

wherein l is 2 or 3, k is at least one, preferably not more than 4, and W is a hydrocarbon group, especially an aliphatic hydrocarbon group, containing 3 to 12 carbon atoms.

Glycerine-2-allyl-1,3-diglycidyl ether is an example in formula (IV).

In the general formula (II), the oligomer residue Z is preferably an oligoester residue. The introduction of an acryloyl or methacryloyl group into an oligomer containing the residue Z can be accomplished by the same method as described hereinabove with regard to the unsaturated oligomer (A). Generally, this can be accomplished by either (i) reacting a hydroxyl-terminated allyloxy group-containing oligoester (oligoester polyol) with an acryloyl halide or methacryloyl halide or glycidyl acrylate or methacrylate in stoichiometric amounts in the presence, if desired, of a catalyst, in accordance with the reaction equation (A) or (B) above, (ii) reacting a carboxyl group-terminated allyloxy group-containing oligoester (oligoester polycarboxylic acid) with a hydroxyl group-containing acrylate or methacrylate or glycidyl acrylate or glycidyl methacrylate in the presence, if desired, of an esterification reaction catalyst, in accordance with the reaction equation (C) and (D), or (iii) reacting an epoxy group-terminated allyloxy group-containing oligoester (oligoester polyepoxide) with a hydroxyl group-containing acrylate or methacrylate or acrylic acid or methacrylic acid in accordance with the reaction equation (E) or (F).

As stated hereinabove, the hydroxyl group-terminated or carboxyl group-terminated allyloxy group-containing oligoester can be prepared by oligo-condensing at least one of the aliphatic, aromatic and alicyclic polycarboxylic acids or their anhydrides not containing an ethylenic unsaturated double bond with an allyloxy group-containing polyhydric alcohol or a combination of it with another polyhydric alcohol under conditions known per se. Useful polyhydric alcohols other than the allyloxy group-containing polyhydric alcohols are those described in detail hereinabove with respect to the unsaturated oligomer (A). When such a polyhydric alcohol is used, the allyloxy group containing polyhydric alcohol is preferably incorporated in an amount of 50 to 100 mole% based on the entire alcohol component so that at least one polyhydric alcohol containing an allyloxy group is present in the resulting oligoester molecule.

In the oligomer (B) used in this invention, too, the oligomer residue Z may contain a urethane linkage in addition to the allyloxy group. Such an oligomer (B) can be prepared by reacting the allyloxy group-containing polyhydric alcohol or a hydroxyl group-terminated allyloxy group-containing oligoester (oligoester polyol) with the polyisocyanate compound described hereinabove to prepare an allyloxy group-containing isocyanate group-terminated oligoester (oligoester urethane polyisocyanate), and then reacting the resulting isocyanate group-terminated oligoester with a hydroxyl group-containing acrylate or methacrylate or acrylic acid or methacrylic acid in accordance with the reaction equation (G) or (H). The conditions for preparing the oligomer (B) containing a urethane linkage and an allyloxy group may be substantially the same as those for the preparation of the unsaturated oligomer (A) except some obvious modifications.

The oligomer (B) can also be prepared by oligomerizing at least two monomers such as the polyols, polycarboxylic acids, polyamines, polyisocyanates, and polyepoxides described hereinabove, and also aminocarboxylic acids (or lactams), and hydroxycarboxylic acids in a manner known per se to form an oligoester, oligoamide, oligourethane, oligoester ether, oligoesteramide, oligoester urethane or oligourethane, urea, etc. containing at least 3 active hydrogen-containing reactive terminal groups such as an amino, carboxyl or hydroxyl group, reacting this oligomer with an allyloxy group-monoepoxide, such as glycidyl allyl ether, to form an allyloxy group-containing oligomer, and then reacting the allyloxy group-containing oligomer with acrylic acid, methacrylic acid or its reactive derivative in the manner described hereinabove.

So long as the allyloxy group-containing acrylic or methacrylic oligomer used in this invention contains at least one allyloxy group and at least 2 acryloyl or methacryloyl groups, no particular restriction is imposed on the method of its preparation, the types of the monomers, or their combination. Oligomers (B) may be used along or in combination of two or more.

In order to obtain resin compositions having ready curability in air which will give cured products having superior physical and chemical properties, it is important that the oligomer (B) should contain at least 2 acryloyl or methacryloyl groups and at least one allyloxy group per molcule. Furthermore, for the same reason as given with hereinabove regard to the unsaturated oligomer (A), it is important that the number average molecular weight of the oligomer (B) should be within the range of 500 to 4,000. When the number average molecular weight per allyloxy group, that is, the allyloxy equivalent, exceeds 500, there is a tendency tht the curing of the resin composition in air becomes insufficient. Accordingly, the oligomer (B) used in this invention should meet this requirement. When the resin composition of this invention is used as a solventless coating composition, oligomer (B) preferably meets the requirements of the number of acryloyl or methacryloyl groups and the acid number and the hydroxy numbers as described hereinabove with regard to the unsaturated oligomer (A). When the resin composition of this invention is used as an electrodeposition coating composition in the form of an aqueous solution, an emulsion or an aqueous dispersion, carboxyl groups may be left positively to provide oligomers (B) having an acid number of 35 to 65.

In order to cure the resin composition of this invention rapidly in air, it is important that the ethylenic internal double bond-containing acrylic or methacrylic oligomer (A) and the allyloxy group-containing acrylic or methacrylic oligomer (B) should be combined in a weight ratio (A/B) of 8/2 to 2/8, preferably 6/4 to 4/6. Generally, resin compositions comprising the oligomer (A) alone are difficult to cure in air. Even if such resin compositions could be cured in an inert atmosphere such as nitrogen gas, the resulting cured product would not be entirely satisfactory in respect of solvent resistance or weather resistance (see Comparative Example 31 to be given hereinbelow). On the other hand, resin compositions comprising the oligomer (B) alone could be cured in air, but the resulting cured product has still insufficient hardness, and unsatifactory solvent resistance and weather resistance (see Comparative Example 30 to be given hereinbelow). In contrast, according to this invention, resin compositions can be provided which can be cured in air and with superior mechanical or chemical properties (see Example 28 to be given hereinbelow).

The unsaturated oligomer (A) and the oligomer (B) used in this invention have radical polymerizability, and will give cross-linked cured resins by a suitable polymerization initiating means. Thus, without adding other polymerizable monomers, they can be used for various purposes, for example, as a coating agent, molding material, casting material, or sealing material. However, in order to improve workability and the properties of the resulting cured product, the resin composition of this invention may further contain a polymerizable monomer.

There is no strict restriction on the content of such a polymerizable monomer, but generally, its content is 0.5 to 200 % by weight, preferably 1 to 150% by weight, more preferably 10 to 70% by weight, and especially 20 to 50% by weight, based on the total amount of the unsaturated oligomer (A) and the oligomer (B). The type of the polymerizable monomer is not restricted so long as it is miscible with the oligomers (A) and (B) and is radical-polymerizable. Preferably, however, it is a vinyl monomer. Specific examples include polyol acrylates or methacrylates such as polyethylene glycol diacrylate or dimethacrylate, polypropylene glycol diacrylate or dimethacrylate, neopentyl glycol acrylate or methacrylate, trimethylol propane triacrylate or trimethacrylate, pentaerythritol tetraacrylate or tetramethacrylate, or methoxypolyethylene glyco acrylate or methacrylate; high-molecular-weight acrylic or methacrylic esters such as polyester acrylate or methacrylate and polyoxy acrylate or methacrylate; acrylic acid and methacrylic acid; lower alkyl esters of acrylic or methacrylic acid such as methyl acrylate or methacrylate, butyl acrylate or methacrylate or 2-hydroxyethyl acrylate or methacrylate or 2-hydroxyethyl acrylate or methacrylate; styrene and styrene derivatives such as α-methylstyrene or β-chlorostyrene; organic nitriles such as acrylonitrile, methacrylonitrile or 2-methylene glutaronitrile; vinyl esters of organic acids such as vinyl acetate or vinyl propionate; and acrylamide and methacrylamide. Of these, styrene or its derivatives, acrylic acid, methacrylic acid, and esters of these acids are preferred. Styrene is most preferred.

The resin composition of this invention has superior curability in air and is liquid. It can be used not only as a solventless coating composition without any additives, but also as molding materials, casting materials, and sealing materials.

In order to adjust the curability, stability and rheological properties of the resin composition of this invention according to its use or to impart the desired properties to the final product, various known additives can be incorporated in the resin composition of this invention.

For example, in order to prevent early gellation or prepolymerization of various oligomers or monomers, a polymerization inhibitor may be incorporated in the resin composition of this invention. Useful polymerization inhibitors are those generally used for vinyl monomers, such as hydroquinone, benzoquinone or tert.-butyl catechol. The polymerization inhibitor can be added to the starting materials for synthesizing oligomer (A) and/or oligomer (B), or during the synthesis of these oligomers. Alternatively, it may be added to the oligomers (A) and/or (B) as prepared. The amount of the polymerization inhibitor is desirably 10 to 1,000 ppm based on the total weight of the oligomers (A) and (B).

The resin composition of this invention has the property of becoming cross-linked macromolecules upon polymerization and cross-linking by such polymerization initiating means as heating, ultraviolet irradiation, or ionizing radiation. In order to promote the cross-linking of the composition, an organic metal salt, such as lead naphthenate, lead stearate, zinc naphthenate, tin oleate, dibutyltin maleate, manganese naphthenate, cobalt naphthenate or a lead salt of resin acid, may be added to the resin composition in an amount of 0.2 to 3.0% based on the total weight of the oligomers (A) and (B).

Furthermore, various natural, semi-synthetic or synthetic resins can be incorporated in the resin composition of this inventin in order to improve the properties of the final cured product. Examples of these resins are oleoresins such as drying oils or semi-drying oils, rosin, shellac, copals, oil-modified rosin, phenol resins, alkyd resins, melamine resins, urea resins, polyester resins, polyvinyl butyral resins, polyvinyl acetate resins, polyvinyl chloride resins, polyacrylate or polymethacrylate, epoxy resins, and silicon resins. They can be used either alone or in combination of two or more. These modifying resins can be incorporated in amounts that do not impair the inherent properties of the oligomers (A) and (B), for example, up to 2% by weight.

Various reinforcing materials or pigments can be incorporated in the resin composition of this invention. For example, there can be incorporated an inorganic filler such as carbon black, finely divided silica, calcined clay, basic magnesium silicate, diatomaceous earth, alumina, calcium carbonate, magnesium carbonate, magnesia, kaolin, or sericite. In order to color the resin composition, a white pigment such as titanium dioxide, an inorganic colored pigment such as yellow lead, carbon black, iron black, molybdenum red, Prussian blue, ultramarine, cadmium yellow, cadmium red, or aluminum powder, or an organic colored pigment such as phthalocyanine blue, permanent red or madder lake can also be incorporated in the resin composition.

When the resin composition of this invention is to be used as a primer coating composition for a metal substrate, an anti-corrosive pigment such as zinc chromate, red lead, red iron oxide, zinc flower or strontium chromate can be added in addition to the above coloring pigment. Furthermore, the resin composition of this invention may contain an antisag agent such as aluminum stearate, a levelling agent such as silicone or fluorine resins, a thixotropy adjusting agent such as a surface active agent, a plasticizer such as dioctyl phthalate or a flame retardant such as diantimony pentoxide or diantimony trioxide, in accordance with recipes known per se.

Usually, the resin composition of this invention is liquid, and is used as a solventless coating composition requiring any solvent. For example, the resin composition of this invention without a solvent can be coated easily on the surface of a substrate such as wood, plastics, paper or metals in the form of a thin film. This film, furthermore, has the property of being cured rapidly in air. Accordingly, the resin composition of this invention is useful as a coating material such as various paints.

The resin composition of this invention may be coated on various substrates by various known means such as dip coating, brush coating, roller coating, spray coating, bar coater application, flow coater application, electrostatic coating, or a electrodeposition coating.

After being coated on various substrates, the resin composition is cured by heat or with the use of a polymerization initiator. Examples of the polymerization initiator include an azo compound such as azobisisobutyronitrile, 1-azobis-1cyclohexanecarbonitrile, or 2,2'-azobispropane, and a peroxide such as benzoyl peroxide, di-tert.-butylperoxide or 2,4-dichlorobenzoyl peroxide, which are used either alone or in combination with a polymerization promoter such as dimethylaniline. The polymerization initiator may be used in a catalytic amount, for example, in an amount of 0.1 to 5.0% by weight based on the total weight of the oligomers (A) and (B). When the coating is to be heated, the heating temperature employed is generally 40° to 150° C., especially 50° to 120° C. although it varies considerably according to the presence or absence of the initiator or the type of the resin composition. Preferably, the curing of the coating is substantially completed by heat-treatment for 15 to 120 minutes.

In addition to heating or the use of an initiator, ionizing radiation or light (ultraviolet rays) can also be used to cure the resin composition. Examples of the ionizing radiation are electron beams from various accelerators such as a van de Graaff accelerator or a liner accelerator, and gamma-rays from various isotopes such as cobalt-60. The light source for photocuring may, for example, be sunlight, a tungsten-filament lamp, an arc lamp, a xenon lamp, a halogen lamp, or a mercury lamp. In the case of photocuring, a photosensitizer, for example, an organic carbonyl compound such as benzoin, benzoin methyl ether, benzoin ethyl ether, benzoin propyl ether, benzathrone, anthraquinone or benzophenone, or a combination of a sensitizing dye such as eosin, erythrosine or acridine with various amines can be incorporated in the resin composition in an amount of up to 5% by weight based on the total weight of the oligomers (A) and (B).

The novel resin composition of the invention has the property of being cured rapidly in air, and the resulting coating has various superior properties such as solvent resistance, weather resistance surface hardness or impact resistance. Accordingly, it is useful as a surface coating material for various substrates such as wood, plastics, paper or metals, and especially as anti-corrosive, fire-retardant, flame-retardant, weather resistant, moisture-proof and finishing paints. It also has utility as a wire enamelling varnish.

Although, the resin composition of this invention is especially useful as a solventless coating composition, it can also be used as molding or casting materials for the preparation of various molded articles and as sealants.

The present invention is illustrated further by the following Examples and Comparative Examples. Unless otherwise specified, all parts in these examples are by weight.

In these examples, various properties were measured by the following methods.

1. Preparation of Test Pieces

A coating of the resin composition is formed in a thickness of 30 to 40 microns on a steel plate finished by "Bonderizing". The test piece is used in each of the tests after being allowed to stand for one day in a room held at controlled temperature and humidity.

2. Test Procedures

1. Impact resistance

It is measured in accordance with JIS K-5400 using a Du Pont-type impact tester. This test is to examine whether cracks or peeling occurs in the coating when a steel ball is caused to collide with the surface of the coating. The result is expressed by the maximum falling distance of the ball which does not cause cracks nor peeling. The weight of the ball is 500 g or 350 g.

2. Flexural resistance

It is measured in accordance with JIS K-5400. With the coated surface of the test piece being exposed outside, the test piece is bended by 180° using a spindle with a given diameter as an axis, and cracks or peeling occurring on the coating at this time is examined. The resistance to bending is expressed by the minimum diameter of the spindle that does not cause cracks nor peeling in the coating.

3. Resistance to toluene

It is measured in accordance with JIS K-5400. The test piece is immersed in reagent-grade toluene for 7 hours at room temperature, and then, the state of the coating is observed visually and evaluated on a prescribed scale.

4. Resistance to methyl ethyl ketone (MEK)

It is measured in accordance with JIS K-5400. The test piece is immersed in reagent-grade MEK for 7 hours at room temperature, and then the state of the coating is observed visually and evaluated on a prescribed scale.

5. Resistance to gasoline

The test piece is immersed in commercially available high-octane gasoline for 7 hours, and then, the state of the coating is observed visually and evaluated on a prescribed scale.

6. Resistance to alkali

It is measured in accordance with JIS K-5400. The test piece is immersed in a 3% aqueous solution of sodium hydroxide for 7 hours at room temperature, and then, the state of the coating is observed visually and evaluated on a prescribed scale.

7. Weather resistance

It is measured in accordance with JIS K-;b 5400. The test piece is exposed to ultraviolet rays for 500 hours using a Weather-O-meter (a product of Toyo Rika Kogyo Kabushiki Kaisha, Japan), and then, the state of the coating is observed visually and evaluated on a prescribed scale.

8. Pencil hardness

It is measured in accordance with JIS K-5400 using a tester supplied by Ueshima Seisakusho. The resistance of the coating to scratch is examined in terms of the breakage of the coating with varying hardness of a pencil core.

9. Cross-cut test

Eleven lines, running both longitudinally and transversely, are drawn on the coated surface of the test piece at an interval of 1 mm to provide 100 square areas each with 1 mm². An adhesive tape is applied onto the coated surface, and pulled away. The number of square areas which remain unremoved is counted. The tester used is a cross-cut tester supplied by Ueshima Seisakusho.

10. Erichsen test

An Erichsen tester supplied by Ueshima Seisakusho is used. A pushing rod 20 mm in diameter wth its tip being a spherical surface is pushed against that surface of the test piece which is opposite to the coated surface. The coating that has been pushed out is observed, and the pushed length of the test piece immediately before the occurrence of cracks or breakage is determined.

The tests in (3) to (7) were evaluated on a scale of four grades: good, somewhat good, somewhat poor, poor.

AN ALLYLOXY GROUP-CONTAINING OLIGOMER

Synthesis Example I

First Step 118.5 parts of phthalic anhydride and 278.8 parts of trimethylol propane monoallyl ether were reacted in an atmosphere of nitrogen at 200° C. while evaporating off water generated (first stage). One hour later, 69.8 parts of trimethylol propane monoallyl ether and 50 parts of xylene were added and the reaction was further performed for 48 hours (second stage). The xylene and excess trimethylol propane monoallyl ether were removed by distillation at reduced pressure, and 49.4 parts of phthalic anhydride and 50 parts of xylene were added, and the reaction was carried out for 48 hours (third stage). Then, the xylene and excess trimethylol propane monoallyl ether were again removed by distillation at reduced pressure to afford an oligomer ester diol having an acid number of not more than 2, and a number average molecular weight of about 1,400 and an allyloxy group equivalent of about 280.

Second Step 100 parts of the resulting oligoester diol, 54.4 parts of pyridine and 65.3 parts of methacryloyl chloride were reacted in benzene at 20° C. for 9 hours. After washing the reaction mixture and removing low-boiling components by distillation at reduced pressure, there was obtained an oligester methacrylate having an acid number of less than 2.0 and a number average molecular weight of 1,600 and an allyloxy group equivalent of 310 (oligomer A).

Oligomers shown in Table 1 below were prepared by operating in the same way as in Synthesis Example I above except that the monomers and reaction conditions shown in Table 1 were employed.

Table 1

| Oligomer | B | C | D | E | F | G |
|---|---|---|---|---|---|---|
| FIRST STEP | | | | | | |
| 1st Stage | | | | | | |
| Monomer (parts) | PA 207.4 | ADA 102.2<br>SBA 60.6 | PA 222.2 | PA 88.8 | PA 74.4 | PA 133.2<br>ADA 14.6 |
| Monomer (parts) | TMPMA 122.0 | PEDA 172.8<br>DEG 31.8 | PEDA 108.1 | GMAE 110.4 | PEDA 162.0<br>PG 26.6 | TMEMA 79.5 |
| Reaction temperature (° C.) | 200 | 200 | 200 | 200 | 200 | heated from 140 to 200° C at a rate of 100° C/hr. |
| Reaction time(hr) | 1 | 2 | 1 | 4 | 24 | 7 |
| 2nd Stage | | | | | | |
| Monomer (parts) | — | — | — | GMAE 27.6 | — | — |
| Solvent (parts) | Xylene 50 | Xylene 80 | Xylene 50 | Xylene 20 | Xylene 40 | Xylene 50 |

Table 1-continued

| Oligomer | B | C | D | E | F | G |
|---|---|---|---|---|---|---|
| Reaction temperature (° C.) | 200 | 200 | 200 | 200 | 200 | 200 |
| Reaction time (hr) | 12 | 22 | 12 | 24 | 36 | 5 |
| 3rd Stage | | | | | | |
| Monomer (parts) | | PA 59.2 | | PA 44.4 | | |
| Solvent (parts) | | — | | Xylene 50 | | |
| Reaction temperature (0° C.) | | 200 | | 200 | | |
| Reaction time (hr) | | 24 | | 30 | | |
| 4th Stage | | | | | | |
| Monomer (parts) | | | | GMAE 55.2 | | |
| Solvent (parts) | | | | — | | |
| Reaction temperature (° C.) | | | | 200 | | |
| Reaction time (hr) | | | | 46 | | |
| SECOND STEP | | | | | | |
| Product of the first step (parts) | 100 | 100 | 100 | 100 | 100 | 100 |
| (meth) acryloyl group-affording agent (parts) | GMA 63.1 | GMA 17.2 | GMA 66.2 | AC 64.6 | AC 50.3 | GMA 43.7 |
| Solvent (parts) | Xylene | Toluene | Xylene | Benzene | Benzene | Toluene |
| Additive (parts) | BMA 0.26 BQ 0.06 | BMA 0.2 MQ 0.06 | EMA 0.27 BQ 0.06 | Pyridine 62.1 | Pyridine 48.3 | BMA 0.4 MQ 0.03 |
| Reaction temperature (° C.) | 90 | 90 | 90 | 22 | 20 | 90 |
| Reaction time (hr) | 5 | 5 | 5 | 8 | 8 | 5 |
| PRODUCT | | | | | | |
| Acid number | below 2.0 | below 2.0 | below 2.0 | below 2.0 | below 2.0 | below 2.0 |
| Number average molecular weight | 1200 | 3600 | 1100 | 810 | 1000 | 1600 |
| Allyloxy group equivalent | 490 | 250 | 290 | 220 | 180 | 400 |
| Name | Allyloxy group-containing oligoester methacrylate | Allyloxy group-containing oligoester methacrylate | Allyloxy group-containing oligoester methacrylate | Allyloxy group-containing oligoester acrylate | Allyloxy group-containing oligoester acrylate | Allyloxy group-containing oligoester methacrylate |

The abbreviations used in the above table have the following meanings.
PA: phthalic anhydride, ADA: adipic acid, SBA: sebacic acid, THEMA: trimethylolethane monoallyl ether, TMPMA: trimethylolpropane monoallyl ether, PEDA: pentaerythritol diallyl ether, DEG: diethylene glycol, GMAE: glycerol monoallyl ether, PG: propylene glycol, GMA: glycidyl methacrylate AC: acrylylchloride, BMA: benzyl dimethylamine, BQ: benzoquinone MQ: methoquinone

Synthesis Example II 59.3 parts of phthalic anhydride, 14.6 parts of adipic acid, 108 parts of pentaerythritol diallyl ether and 46.5 parts of ethylene glycol were reacted in an atmosphere of nitrogen at 200° C. while evaporating off water generated. One hour later, 50 parts of xylene was added, and the reaction was performed for 48 hours. Then, 200 parts of pentaerythritol diallyl ether was added, and the reaction was performed for 12 hours. The xylene and excess pentaerythritol diallyl ether were removed by distillation at reduced pressure to afford an allyloxy group-containing oligoester diol having an acid number of not more than 2.0 and a number average molecular weight of about 2,000 and an allyloxy group equivalent of about 310.

100 parts of the resulting oligoester diol was reacted with 20 parts of tolylene diisocyanate in toluene at 60° C. for 2 hours. Then, 15 parts of 2-hydroxyethyl acrylate was added, and the reaction was performed for 1 hour at 60° C. The toluene was removed by distillation at reduced pressure to afford an oligoester acrylate having an acid number ofless than 2.0 and a number average moleculare weight of 2,600 and an allyloxy group equivalent of 400 (oligomer H).

Synthesis Example III 266.6 parts of phthalic anhydride and 129.8 parts of pentaerythritol diallyl ether were reacted in an atmosphere of nitrogen at 200° C. while evaporating off water generated. Three hours later, 60 parts of xylene was added, and the reaction was performed for an additional 57 hours. Then, the xylene and excess phthalic anhydride were removed by distillation at reduced pressure to afford an allyloxy group-containing oligoester dicarboxylic acid having an acid number of 142 and a number average molecular weight of about 800 and an allyloxy group equivalent of 220.

100 parts of the oligoester dicarboxylic acid and 71.0 parts of hexahydro-m-xylylenediamine were reacted in an atmosphere of nitrogen at 200° C. while evaporating off water generated. One hour later, 50 parts of xylene was added, and the reaction was performed for 5 hours. The xylene and excess hexahydro-m-xylylenediamine were removed by distillation at reduced pressure to afford an allyloxy group-containing oligoamide ester diamine having an acid number of less than 2, a number average molecular weight of 1,100 and an allyloxy group equivalent of 280.

100 parts of the resulting oligodiamine was reacted in xylene with 54.2 parts of glycidyl methacrylate and 0.2 part of methoquinone at 130° C for 5 hours. Then, the xylene and excess glycidyl to afford an allyloxy group-containing oligoamide ester methacrylate having an acid number of less than 2, a number average molecular weight of 1,300 and an allyloxy group equivalent of 360 (oligomer I).

Synthesis Example IV 100 parts of the allyloxy group-containing oligoester diol prepared in Synthesis Example I was reacted in toluene with 47.9 parts of 4,4'-diphenylmethane diisocyanate. Then, 27.9 parts of 2-hydroxyethyl methacrylate was added, and the reaction was performed for 1 hour at 60° C. The toluene was removed by distillation at reduced pressure to afford an allyloxy group-containing oligoester methacrylate having an acid number of less than 2, a number average molecular weight of 2,200 and an allyloxy group equivalent of 430 (oligomer J).

Synthesis Example V 99.6 parts of isophthalic acid and 259.5 parts of pentaerythritol diallyl ether were reacted in an atmosphere of nitrogen at 200° C. while evaporating off water generated. Four hours later, 64.9 parts of pentaerythritol diallyl ether was added, and the reaction was further continued for 20 hours. Then, 49.8 parts of isophthalic acid was added, and the reaction was further performed for 6 hours. 64.9 parts of pentaerythritol diallyl ether was added, and the reaction was performed for an additional 17 hours. Further, 64.9 parts of pentaerythritol diallyl ether was added, and the reaction was performed for 24 hours. 50 parts of xylene was added, and the reaction was performed for an additional 24 hours. The xylene and excess pentaerthyritol diallyl ester were removed by distillation at reduced pressure to afford an allyloxy group-containing oligoester diol having an acid number of less than 2, a number average molecular weight of about 1,400 and an allyloxy group equivalent of about 160.

100 parts of the resulting oligoester diol, 31.0 parts of pyridine and 37.3 parts of methacryloyl chloride were reacted in benzene at 27° C. for 9 hours. After washing the reaction product and removing low-boiling components by distillation, there was obtained an allyloxy group-containing oligoester methacrylate having an acid number of less than 2, a number average molecular weight of 1,500 and an allyloxy group equivalent of 170 (oligomer K).

Synthesis Example VI 236.8 parts of phthalic anhydride and 43.2 parts of pentaerythritol diallyl ether were reacted in an atmosphere of nitrogen at 180° C. for 5 hours. The excess phthalic anhydride was removed by distillation at reduced pressure to afford an allyloxy group-containing oligoester dicarboxylic acid having an acid number of 220, a number average molecular weight of about 500 and an allyloxy group equivalent of about 260.

100 parts of the resulting oligoester dicarboxylic acid and 109 parts of tetramethylene diisocyanate were reacted in an atmosphere of nitrogen at 180° C. for 1 hour, and then at 220° C. for 3 hours. The excess tetramethylene diisocyanate was removed by distillation at reduced pressure to afford an allyloxy group-containing oligoester amide diisocyanate having an acid number of less than 2, a number average molecular weight of 730 and an allyloxy group equivalent of about 360.

100 parts of the resulting oligoester diisocyanate and 63.2 parts of 2-hydroxyethyl acrylate were reacted in toluene in an atmosphere of nitrogen at 60° C. for 3 hours. Low-boiling components were removed by distillation at reduced pressure to afford an allyloxy group-containing oligoester amide acrylate having an acid number of less than 2, a number average molecular weight of 960, and an allyloxy group equivalent of 480 (oligomer L).

Synthesis Example VII 108.0 parts of pentaerythritol diallyl ether and 504.0 parts of hexamethylene diisocyanate were reacted in toluene at 60° C. for 1 hour. The toluene and excess hexamethylene diisocyanate were removed by distillation at reduced pressure to afford an isocyanate group-terminated, allyloxy group-containing oligourethane diisocyanate having a number average molecular weight of about 550 and an allyloxy group equivalent of about 280.

100 parts of the oligourethane diisocyanate obtained was reacted with 168.7 parts of 2-hydroxyethyl acrylate in toluene at 60° C. for 1 hour. Then, the toluene and excess 2-hydroxyethyl acrylate were removed at reduced pressure to afford an allyloxy group-containing oligourethane acrylate having a number average molecular weight of 780 and an allyloxy group equivalent of 400 (oligomer M).

ETHYLENIC INTERNAL DOUBLE BOND-CONTAINING OLIGOMER

Synthetic Example VIII

First Step 92.9 parts of fumaric acid, 80.5 parts of trimethylol propane and 191.0 parts of diethylene glycol were reacted in an atmosphere of nitrogen at 180° C. while evaporating off water generated (first stage). One hour later 50 parts of xylene was added and the reaction was further performed for 48 hours at 200° C. (second stage). Then the xylene, trimethylol propane and diethylene glycol were removed by distillation at reduced pressure to afford an oligoester diol having an acid number of less than 2.0 and a number average molecular weight of about 1300, and containing about 6 fumaroyl groups.

Second Step 100 parts of the resulting oligoester diol, 54.4 parts of pyridine and 65.3 parts of methacryloyl chloride were reacted in benzene at 20° C. for 9 hours. After washing the reaction mixture and removing low-boiling components by distillation at reduced pressure, there was obtained an oligoester methacrylate having an acid number of less than 2.0 and a number average molecular weight of 1500 and containing 6 fumaroyl groups (oligomer N).

Oligomers shown in Table 2 below were prepared by operating in the same way as in Synthesis Example VIII above except that the monomers and reaction conditions shown in Table 2 were employed.

Table 2

| Oligomer | O | P | Q | R | S |
|---|---|---|---|---|---|
| FIRST STEP | | | | | |
| 1st Stage | | | | | |
| Monomer (parts) | MAN 58<br>PA 74 | FA 116.0 | FA 81.2<br>ADA 73.0 | MAN 88.2<br>PA 133.2 | MA 174.0<br>IA 249.0 |
| Monomer (parts) | DEG 106 | TMP 100.5<br>DEG 238.5 | DEG 74.2<br>PG 45.6 | PG 76.0 | DEG 53.0<br>EG 31.0 |
| Reaction temperature (° C.) | 180 | 180 | 180 | 180 | 180 |
| Reaction time (hours) | 1 | 2 | 1 | 1 | 1 |
| 2nd Stage | | | | | |
| Monomer (parts) | — | — | — | — | — |
| Solvent (parts) | Xylene 50 | — | — | Xylene 50 | Xylene 80 |

Table 2-continued

| Oligomer | O | P | Q | R | S |
|---|---|---|---|---|---|
| Reaction temperature (° C.) | 200 | 200 | 200 | 200 | 200 |
| Reaction time (hours) | 48 | 18 | 9 | 12 | 12 |
| 3rd Stage | | | | | |
| Monomer (parts) | PA 40 | — | — | MAN 58.0) | |
| Solvent (parts) | — | Xylene 50 | Xylene 50 | — | |
| Reaction temperature (° C.) | 200 | 200 | 200 | 200 | |
| Reaction time (hours) | 12 | 12 | 12 | 5 | |
| 4th Stage | | | | | |
| Monomer (parts) | | | DEG 212 | | |
| Solvent (parts) | | | — | | |
| Reaction temperature (° C.) | | | 200 | | |
| Reaction time (hours) | | | 10 | | |
| SECOND STEP | | | | | |
| Product of the first step (parts) | 100 | 100 | 100 | 100 | 100 |
| (meth) acryloyl group-affording agent (parts) | GMA 63.1 | MC 80.5 | AC 19.7 | GMA 37.8 | GMA 81.1 |
| Solvent (parts) | Xylene | Benzene | Benzene | Toluene | Toluene |
| Additive (parts) | BMA 0.26 BQ 0.06 | Pyridine 67.2 | Pyridine 18.9 | BMA 0.3 HQME 0.03 | BMA 0.4 HQME 0.03 |
| Reaction temperature (° C.) | 90 | 25 | 30 | 90 | 90 |
| Reaction time (hours) | 5 | 9 | 8 | 5 | 5 |
| PRODUCT | | | | | |
| Acid number | below 2.0 | below 2.0 | below 2.0 | below 2.0 | below 2.0 |
| Number average molecular weight | 2500 | 1500 | 2400 | 1800 | 980 |
| Number of fumaroyl or mallayl groups in the molecule | 5 | 6 | 7 | 5 | 2 |
| Name | Oligoester methacrylate | Oligoester methacrylate | Oligoester acrylate | Oligoester methacrylate | Oligoester methacrylate |

The abbreviations used in the above table have the following meanings.
PA: phthalic anhydride, ADA: adipic acid, IPA: isophthalic acid, DEG: diethylene glycol, PG: propylene glycol, FA: fumaric acid, MAN: maleic anhydride, MA: maleic acid, TMP: trimethylol propane, EG: ethylene glycol, GMA: glycidyl methacrylate, AC: acryloylchloride, MC: methacryloylchloride, BMA: benzyl dimethyl amine, BQ: benzoquinone, HQME: hydroquinone monomethyl ether.

Synthesis Example IX 58.0 parts of fumaric acid and 53.1 parts of diethylene glycol were reacted in an atmosphere of nitrogen at 180° C. while evaporating off water generated. One hour later, 20 parts of xylene was added, and the reaction was further performed for 59 hours at 200° C. Then, the xylene and diethylene glycol were removed by distillation at reduced pressure to afford an oligoester dicarboxylic acid having an acid number of 163 and a number average molecular weight of about 700 and containing about 4 fumaroyl groups in the molecule.

100 pats of the resulting oligoester dicarboxylic acid was reacted with 149.3 parts of ethylene glycol diglycidyl ether and 1.2 parts of benzyl dimethylamine at 125° C. for 4 hours. Then, the unreacted monomers were removed by distillation at reduced pressure. Then, 73.7 parts of methacrylic acid, 0.20 part of benzyl dimethylamine and 0.02 part of benzoquinone were added as a xylene solution, and the reaction was performed for 5 hours at 90° C. The xylene and unreacted monomers were removed by distillation at reduced pressure to afford a fumaroyl group-containing oligoester methacrylate having an acid number of less than 2.0, and a number average molecular weight of 1,200 and containing 4 fumaroyl groups in the molecule (oligomer T).

Synthesis Example X 100 parts of the oligoester polyol prepared during the synthesis of the oligomer N was reacted with 30.8 parts of tolylene diisocyanate in toluene at 60° C. for 2 hours. Then, 23.1 parts of 2-hydroxyethyl acrylate was added, and the reaction was further carried out for 1 hour at 60° C. The toluene was removed by distillation at reduced pressure to afford a fumaroyl group-containing oligoester acrylate having an acid number of less than 2.0 and a number average molecular weight of 1,900 and containing 6 fumaroyl groups in the molecule (oligomer U).

Synthesis Example XI 69.6 parts of fumaric acid, 143.1 parts of diethylene glycol and 30.0 parts of ethylene glycol were reacted in an atmosphere of nitrogen at 200° C. while evaporating off water generated. Nine hours later, 50 parts of xylene was added, and the reaction was carried out for an additional 51 hours. The xylene, diethylene glycol and ethylene glycol were removed by distillation to afford a fumaroyl group-containing oligoester diol having an acid number of less than 2 and a number average molecular weight of about 650 and containing 3 fumaroyl groups in the molecule.

100 parts of the resulting oligoester diol was reacted with 55.0 parts of tolylene diisocyanate in toluene at 60° C. for 1 hour. Then, the toluene and excess tolyelene diisocyanate were removed by distillation at reduced pressure, and 42.0 parts of 2-hydroxyethyl methacrylate and toluene were added, and the reaction was performed for 1 hour at 60° C. Finally, the toluene and excess 2-hydroxyethyl methacrylate were removed by distillation at reduced pressure to afford a fumaroyl group-containing oligoester methacrylate having an acid number of less than 2 and a number average molecular weight of 1,200 and containing 3 fumaroyl groups in the molecule (oligomer V).

Synthesis Example XII 174.0 parts of fumaric acid and 53 parts of diethylene glycol were reacted in an atmosphere of nitrogen at 180° C. while evaporating off water generated. One hour later, 20 parts of xylene was added, and the reaction was performed for an additional 12 hours at 200° C. Then, the xylene and fumaric acid were removed by distillation at reduced pressure to afford a fumaroyl group-containing oligoester dicarboxylic acid having an acid number of 158.5 and a number average molecular weight of about 670 and containing 4 gumaroyl groups in the molecule.

100 parts of the resulting oligoester dicarboxylic acid was reacted with 155.2 parts of diglycidyl ether and 1.2 parts of benzyl dimethylamine in toluene at 100° C. for 4 hours. Then, the solvent and excess diglycidyl ether were removed by distillation at reduced pressure. Then, 102.7 parts of methacrylic acid, 0.2 part of benzyl dimethylamine and 0.02 part of benzoquinone were added as a xylene solution, and the reaction was further performed at 90° C. for 3 hours. The xylene and the excess methacrylic acid, etc. were removed by distillation at reduced pressure to afford a fumaroyl group-containing oligoester methacrylate having an acid number of less than 2 and a number average molecular weight of 1,100 and containing 4 fumaroyl groups in the molecule (oligomer W).

Synthesis Example XIII 348.0 parts of fumraic acid and 71.0 parts of hexahydro-m-xylenediamine were reacted in an atmosphere of nitrogen at 200° C. for 10 hours while evaporating off water generated. Then, the excess fumaric acid was removed by distillation at reduced pressure, and 426.0 parts of hexahydro-m-xylelendiamine was added. The reaction was performed for an additional 10 hours. Then, the excess hexahydro-m-xylenediamine was removed by distillation at reduced pressure to afford an amino group-terminated oligoamide diamine having a number average molecular weight of about 580 and containing 2 fumaroyl groups in the molecule.

100 parts of the resulting oligoamide diamine was reacted with 193.8 parts of glycidyl methacrylate and 0.3 part of hydroquinone monomethyl ether at 50° C. for 6 hours. Then, the excess glycidyl methacrylate was removed by distillation at reduced pressure to afford a fumaroyl group-containing oligoamide methacrylate having a number average molecular-weight of 870 and containing 2 fumaroyl group (oligomer X).

Synthesis Example XIV 348.0 parts of fumaric acid and 87.1 parts of tolylene diisocyanate were heated in an atmosphere of nitrogen at 170° C. for 1 hour, and then at 220° C. for 3 hours. Then, the excess fumaric acid was removed by distillation at reduced pressure. 522.6 parts of tolylene diisocyanate was further added, and the reaction was performed at 170° C. for 1 hour, and then at 220° C. for 3 hours. The excess tolylene diisocyanate was removed by distillation at reduced pressure to afford an isocyanate group terminated oligoamide diisocyanate having a number average molecular weight of about 700 and containing 2 fumaroyl groups in the molecule.

100 parts of the resulting oligoamide diisocyanate was reacted with 148.6 parts of 2-hydroxyethyl methacrylate and 0.1 part of benzoquinone at 60° for 1 hours. Then, the excess 2-hydroxyethyl methacrylate was removed for distillation at reduced pressure to afford a fumaroyl group-containing oligoamide methacrylate having a number average molecular weight of 960 with 2 fumaroyl groups in the molecule (oligomer Y).

Synthesis Example XV 348.0 parts of fumaric acid, 65.0 parts of diglycidyl ether and 0.6 part of benzyl dimethylamine were reacted in toluene at 100° C. for 4 hours, and then the toluene and excess fumaric acid were removed by distillation at reduced pressure to afford an epoxy-terminated oligoester diepoxide having a number average molecular weight of about 360 and containing 2 fumaroyl groups in the molecule.

100 parts of the resulting oligoester diepoxide were reacted with 284.0 parts of glycidyl methacrylate, 0.5 part of benzyl dimethylamine and 0.02 part of benzoquinone in toluene at 90° C. for 3 hours. Then, the toluene and excess glycidyl methacrylate were removed by distillation at reduced pressure to afford a fumaroyl group-containing oligoester methacrylate having a number average molecular weight of 650 with 2 fumaroyl groups in the molecule (oligomer Z).

Examples 1 to 4 and Comparative Examples 1 to 4

A coating composition was prepared from 100 parts of a mixture of oligomer F and oligomer W with an F/W weight ratio varying between 100/0 and 0/100 as indicated in Table 2, 2 parts of Permek N (a trademark for methyl ethyl ketone peroxide, a product of Nippon Yushi Kabushiki Kaisha), 1 part of a 6% mineral spirit solution of cobalt naphthenate and 1 part of a 10% xylene solution of a fluorine-containing levelling agent FC-431 (trademark for a product of Sumitomo 3M). The resulting coating solution was coated in a thickness of about 30 to 40 microns on a "Bonderized" steel plate on which a wash primer (a product of Nippon Yushi) had been under coated in a thickness of about 3 microns. The coating was heated in air at 50° C. for 1 hour. The properties of the coatings are shown in Table 3.

Table 3

| Examples | Comparative Example 1 | Comparative Example 2 | Example 1 | Example 2 | Example 3 | Example 4 | Comparative Example 3 | Comparative Example 4 |
|---|---|---|---|---|---|---|---|---|
| Properties | | | | F/W ratio | | | | |
| | 100/0 | 90/10 | 80/20 | 60/40 | 40/60 | 20/80 | 10/90 | 0/100 |
| Cross-cut | 70/100 | 90/100 | 100/100 | 100/100 | 100/100 | 100/100 | 100/100 | |
| Erichsen (mm) | 4 | 4 | 5 | 5 | 5 | 5 | 7 | |
| Flexural resistance (mm) | 8 | 7 | 6 | 6 | 6 | 6 | 5 | The composition did not cure |
| Impact resistance (g/10 cm) | 300 | 500 | 500 | 500 | 500 | 500 | 500 (g/20 cm) | |
| Pencil hardness | H | H | H | H | H | HB | 2B | |
| Resistance to toluene | Somewhat poor | Somewhat poor | Somewhat good | Somewhat good | Good | Somewhat good | Somewhat poor | |
| Resistance to MEK | Poor | Somewhat poor | Somewhat good | Somewhat good | Somewhat good | Somewhat good | Poor | |
| Resistance to gasoline | Good | Good | Good | Good | Good | Good | Somewhat good | |
| Resistance to alkali | Somewhat good | Somewhat good | Somewhat good | Somewhat good | Somewhat good | Somewhat good | Somewhat poor | |
| Weather resistance | Somewhat poor | Somewhat good | Somewhat good | Good | Good | Somewhat good | Poor | |

Examples 5 to 8 and Comparative Examples 5 to 8

Various allyloxy group-containing oligomers and ethylenic internal double bond-containing oligomers prepared in the Synthesis Examples were mixed in varying weight ratios shown in Table 4. 6 parts of a 50% dioctyl phthalate solution of benzoyl peroxide and 1 part of a 10% xylene solution of a fluorine-containing levelling agent FC-431 (a product of Sumitomo 3M) were added to 100 parts of each of the mixtures obtained. The resulting coating composition was coated in a thickness of 30 to 40 microns on a "Bonderized" steel plate, and heated in air at 120° C. for 1 hour. The properties of the coatings are shown in Table 4.

Table 4

| Examples | Example 5 | Comparative Example 5 | Example 6 | Comparative Example 6 | Example 7 | Comparative Example 7 | Example 8 | Comparative Ex. 8 |
|---|---|---|---|---|---|---|---|---|
| Oligomer(A)/Oligomer(B) ratio | E/V | | B/W | | L/V | | D/W | |
| Properties | | | | | | | | |
| Cross-cut | 35/65 | 100/0 | 65/35 | 90/10 | 55/45 | 10/90 | 52/48 | 0/100 |
| | 100/100 | 70/100 | 100/100 | 80/100 | 100/100 | | 100/100 | |
| Erichsen (mm) | 6 | 5 | 5 | 4 | 5 | The composition did not cure | 5 | The composition did not cure |
| Flexural resistance (mm) | 4 | 6 | 4 | 6 | 5 | | 4 | |
| Impact resistance (g/10 cm) | 500 | 500 | 500 (g/20 cm) | 500 | 500 | | 500 | |
| Pencil hardness | H | H | H | H | 2H | | 2H | |
| Resistance to toluene | Good | Somewhat Poor | Good | Somewhat Poor | Good | | Good | |
| Resistance to MEK | Somewhat good | Poor | Somewhat good | Somewhat poor | Somewhat good | | Somewhat good | |
| Resistance to gasoline | Good | Good | Good | Good | Good | | Good | |
| Resistance to alkali | Somewhat good | Somewhat good | Somewhat good | Somewhat good | Somewhat good | | Somewhat good | |
| Weather resistance | Somewhat good | Somewhat poor | Good | Somewhat poor | Somewhat good | | Good | |

Examples 9 to 12 and Comparative Examples 9 to 12

The various allyloxy group-containing oligomers and ethylenic internal double bond-containing oligomers prepared in the synthesis Examples were mixed in the weight ratios shown in Table 5. 3 parts of Permek N, 2 parts of a 6% mineral spirit solution of tin octenate and 1 part of a 10% xylene solution of a fluorine-containing levelling agent FC-431 (a product of Sumitomo 3M) were added to 100 parts of each of the mixtures obtained. The resulting coating composition was coated in a thickness of about 30 to 40 microns on a mild steel plate whose surface had been polished with a sand paper (No. 320) and washed with trichloroethylene and allowed to stand either in air at 25° C. (Examples 9 to 12) or in a stream of nitrogen at 25° C. (Comparative Examples 9 to 12) for 24 hours. The properties of the coatings are shown in Table 5.

Table 5

| Examples | Example 9 | Comparative Example 9 | Example 10 | Comparative Example 10 | Example 11 | Comparative Example 11 | Example 12 | Comparative Example 12 |
|---|---|---|---|---|---|---|---|---|
| Oligomer(A)/Oligomer(B) ratio | E/W | | F/V | | L/W | | B/V | |
| | 45/55 | 100/0 | 40/60 | 90/10 | 60/40 | 10/90 | 40/60 | 0/100 |
| Properties | | | | | | | | |
| Cross-cut | 100/100 | 80/100 | 100/100 | 90/100 | 100/100 | 100/100 | 100/100 | 90/100 |
| Erichsen (mm) | 5 | 5 | 5 | 4 | 5 | 4 | 5 | 4 |
| Flexural resistance (mm) | 4 | 5 | 5 | 5 | 5 | 5 | 4 | 4 |
| Impact resistance (g/10 cm) | 500 | 500 | 500 | 300 | 500 | 500 | 500 | 500 |
| Pencil hardness | HB | HB | H | H | HB | HB | H | H |
| Resistance to toluene | Good | Somewhat good | Good | Somewhat good | Good | Somewhat good | Good | Somewhat good |
| Resistance to MEK | Somewhat good | Poor | Somewhat good | Somewhat poor | Somewhat good | Somewhat poor | Somewhat good | Somewhat poor |
| Resistance to gasoline | Good | Good | Good | Good | Good | Good | Good | Good |
| Resistance to alkali | Somewhat good | Somewhat good | Somewhat good | Somewhat good | Somewhat good | Somewhat good | Somewhat good | Somewhat good |
| Weather resistance | Somewhat good | Somewhat poor | Somewhat good | Somewhat poor | Somewhat good | Somewhat poor | Somewhat good | Poor |

Example 13

To 40 parts of oligomer F and 60 parts of oligomer W were added 2 parts of Permek N, 1 part of a 6% mineral spirit solution of cobalt naphthenate and 1 part of a 10% xylene solution of FC-431. The resulting coating composition was coated in a thickness of about 30 to 40 microns on a Bonderized steel plate which had been under coated with a wash primer in a thickness of about 3 microns, and then, heated in air at 80° C. for 1 hour. The properties of the coatings are shown in Table 6.

Comparative Example 13

Example 13 was repeated except that an intermediate oligoester diglycidyl of oligomer W was used instead of oligomer W. The properties of the resulting coating are shown in Table 6.

Comparative Example 14

Example 13 was repeated except that an intermediate oligoester diol of oligomer F was used instead of oligomer F. The properties of the resulting coating was shown in Table 6.

Comparative Example 15

Comparative example 13 was repeated except that an intermediate oligoester diol of oligomer F was used instead of oligmer F. The properties of the resulting coating are shown in Table 6.

ate and a silicone-type levelling agent were added to the solution to form a coating composition. The resulting coating composition was coated in a thickness of about 30 to 40 microns on a Bonderized steel plate whose surface had been under coated with a wash primer in a thickness of about 3 microns. The coatings was heated for 1 hour in air at 50° C. The properties of the coatings obtained are shown in Table 7.

Table 7

| Examples | Comparative Example 16 | Comparative Example 17 | Example 14 | Example 15 | Example 16 | Example 17 | Comparative Example 18 | Comparative Example 19 |
|---|---|---|---|---|---|---|---|---|
| A/P ratio | 100/0 | 90/10 | 80/20 | 60/40 | 40/60 | 20/80 | 10/90 | 0/100 |
| Properties | | | | | | | | |
| Cross-cut | 80/100 | 90/100 | 100/100 | 100/100 | 100/100 | 90/100 | | |
| Erichsen (mm) | 4 | 4 | 5 | 5 | 5 | 5 | | |
| Flexural resistance (mm) | 4 | 4 | 4 | 4 | 4 | 3 | High-surface tackiness | The composition did not cure |
| Impact resistance (g/10 cm) | 500 | 500 | 500 | 500 (g/20 cm) | 500 (g/20 cm) | 500 (g/20 cm) | | |
| Pencil hardness | H | H | H | 2H | 2H | HB | | |
| Resistance to toluene | Somewhat poor | Somewhat good | Good | Good | Good | Somewhat good | | |
| Resistance to MEK | Poor | Somewhat poor | Somewhat good | Somewhat good | Somewhat good | Somewhat good | | |
| Resistance to gasoline | Somewhat good | Somewhat good | Good | Good | Good | Good | | |
| Resistance to alkali | Poor | Poor | Somewhat good | Somewhat good | Somewhat good | Somewhat good | | |
| Weather resistance | Somewhat poor | Somewhat poor | Somewhat good | Somewhat good | Good | Somewhat good | | |

Examples 18 to 21 and Comparative Examples 20 to 23

80 parts of a mixture of oligomers B and P in the varying weight ratios as shown in Table 8 was dissolved Table 6

| Examples | Example 13 | Comparative Example 13 | Comparative Example 14 | Comparative Example 15 |
|---|---|---|---|---|
| Oligomer(A)/Oligomer(B) ratio | 40/60 | 40/60 (W = intermediate) | 40/60 (F = intermediate) | 40/60 (F and W = intermediate) |
| Properties | | | | |
| Cross-cut | 100/100 | 100/100 | 100/100 | 100/100 |
| Erichsen (mm) | 5 | 4 | 5 | 3 |
| Flexural resistance (mm) | 6 | 5 | 5 | 7 |
| Impact resistance (g/10 cm) | 500 | 500 | 500 | 500 (g/20 cm) |
| Pencil hardness | 2H | B | HB | 2B |
| Resistance to toluene | Good | Somewhat good | Somewhat good | Somewhat poor |
| Resistance to MEK | Somewhat good | Poor | Poor | Poor |
| Resistance to gasoline | Good | Somewhat good | Good | Somewhat poor |
| Resistance to alkali | Somewhat good | Somewhat poor | Somewhat good | Poor |
| Weather resistance | Good | Poor | Somewhat poor | Poor |

Examples 14 to 17 and Comparative Examples 16 to 19

50 parts of a mixture of oligomer A and oligomer P in the various ratios shown in Table 7 was dissolved in 20 parts of 2-hydroxyethyl methacrylate, 20 parts of NK-Ester-14G (a trademark for polyethylene glycol dimethacrylate, a product of Shin Nakamura Kagaku) and 10 parts of acrylic acid, and 5 parts of Permek N, 3 parts of a 6% mineral spirit solution of cobalt naphthenin 20 parts of 2-hydroxyethyl methacrylate, and 3 parts of Permek N, 1 part of a 6% mineral spirit solution of covalt naphthenate and a silcione-type levelling agent were added to prepare a coating composition.

The resulting coating composition was coated on a Bonderized steel plate in a thickness of about 30 to 40 microns, and heated in air at 50° C. for 2 hours. The properties of the coatings obtained are shown in Table 8.

Table 8

| Examples | Comparative Example 20 | Comparative Example 21 | Example 18 | Example 19 | Example 20 | Example 21 | Comparative Example 22 | Comparative Example 23 |
|---|---|---|---|---|---|---|---|---|
| B/P ratio | 100/0 | 90/10 | 80/20 | 60/40 | 40/60 | 20/80 | 10/90 | 0/100 |
| Properties | | | | | | | | |
| Cross-cut | — | — | 100/100 | 100/100 | — | — | High-surface tackiness | The composition did not cure |
| Erichsen (mm) | 2 | 2 | 5 | 6 | 7 | 7 | | |
| Flexural resistance (mm) | 8 | 8 | 6 | 4 | 4 | 3 | | |

Table 8-continued

| Examples | Comparative Example 20 | Comparative Example 21 | Example 18 | Example 19 | Example 20 | Example 21 | Comparative Example 22 | Comparative Example 23 |
|---|---|---|---|---|---|---|---|---|
| Impact resistance (g/10 cm) | 300 | 300 | 500 | 500 (g/20 cm) | 500 (g/20 cm) | 500 | | |
| Pencil hardness | H | H | 2H | 2H | H | HB | | |
| Resistance to toluene | Somewhat good | Somewhat good | Good | Good | Good | Somewhat good | | |
| Resistance to MEK | Poor | Somewhat poor | Somewhat good | Somewhat good | Somewhat good | Somewhat good | | |
| Resistance to gasoline | Somewhat good | Somewhat good | Good | Good | Good | Good | | |
| Resistance to alkali | Poor | Somewhat poor | Somewhat good | Somewhat good | Somewhat good | Somewhat poor | | |
| Weather resistance | Somewhat poor | Somewhat poor | Somewhat Good | Good | Somewhat good | Somewhat poor | | |

EXAMPLE 22

25 parts of oligomer C and 15 parts of oligomer R were dissolved in 25 parts of styrene, 25 parts of NK-Ester-M9G (a trademark for methoxypolyethylene glycol methacrylate, a product of Shin Nakamura Kagaku) and 10 parts of acrylic acid, and 2 parts of Permek N, 1 part of a 6% mineral spirit solution of cobalt naphthenate and a silicone-type levelling agent were added. The resulting coating composition was coated in a thickness of about 30 to 40 microns on a mild steel plate whose surface had been polished with a sand paper (No. 320) and washed with trichloroethylene. The coating was heated in air at 60° C. for 1 hour. The properties of the coating are shown in Table 9.

Comparative Example 24

Example 22 was repeated except that oligomer R alone was used in an amount of 40 parts instead of the oligomers C and R. The properties of the coating obtained are shown in Table 9.

Table 9

| Properties | Example 22 | Comparative Example 24 |
|---|---|---|
| Resistance to toluene | Somewhat good | The composition did not cure. |
| Resistance to MEK | Somewhat good | |
| Resistance to gasoline | Good | |
| Resistance to alkali | Somewhat poor | |
| Weather resistance | Somewhat good | |

EXAMPLE 23

30 parts of oligmer I and 20 parts of oligomer W were dissolved in 20 parts of 2-hydroxyethyl methacrylate, 20 parts of NK-Ester-M9G and 10 parts of acrylic acid, and 3 parts of Permek N, 2 parts of a 6% mineral spirit solution of cobalt naphthenate and a silicone-type levelling agent were added.

The resulting coating composition was coated in a thickness of about 30 to 40 microns on a Bonderized steel plate whose surface had been under coated with a wash primer in a thickness of about 3 microns. The coating was allowed to stand in air at 20° C. for 24 hours. The properties of the resulting coating are shown in Table 10.

Comparative Example 25

Example 23 was repeated except that 50 parts of oligomer I alone was used instead of 30 parts of oligomer I and 20 parts of oligomer W. The properties of the coating obtained are shown in Table 10.

Comparative Example 26

Example 23 was repeated except that 5 parts of oligomer I and 45 parts of oligmer W were used instead of 30 parts of oligomer I and 20 parts of iligomer W. The properties of the coating obtained are shown in Table 10.

Table 10

| Properties | Example 23 | Comparative Examples 25 | 26 |
|---|---|---|---|
| Resistance to toluene | Good | Somewhat good | The composition did not cure |
| Resistance to MEK | Somewhat good | Somewhat poor | |
| Resistance to gasoline | Good | Somewhat good | |
| Resistance to alkali | Somewhat good | Poor | |
| Weather resistance | Somewhat good | Somewhat poor | |

EXAMPLE 24

54 parts of oligomer C and 36 parts of the oligomer S were dissolved in 5 parts of methyl methacrylate and 5 parts of acrylic acid, and 2 parts of benzoyl peroxide, 0.3 part of dimethylaniline and a silicone-type levelling agent were added to form a coating composition. The coating composition was coated on a Bonderized steel plate in a thickness of about 30 to 40 microns, and heated in air at 50° C. for 1 hour. The properties of the coating obtained are shown in Table 11.

Comparative Example 27

Example 24 was repeated except that 81 parts of oligomer G and 9 parts of oligomer S were used instead of 54 parts of oligomer G and 36 parts of oligomer S. The properties of the resulting coating are shown in Table 11.

Comparative Example 28

Example 24 was repeated except that 90 parts of oligomer S alone was used instead of 54 parts of oligomer G and 36 parts of oligomer S. The properties of the coating are shown in Table 11.

Table 11

| Properties | Example 24 | Comparative Examples 27 | 28 |
|---|---|---|---|
| Resistance to toluene | Somewhat good | Somewhat poor | The composition did not cure |
| Resistance to MEK | Somewhat | Somewhat | |

Table 11-continued

| Properties | Example 24 | Comparative Examples 27 | 28 |
|---|---|---|---|
| Resistance to gasoline | poor Good | poor Somewhat good | |
| Resistance to alkali | Somewhat good | Somewhat poor | |
| Weather resistance | Somewhat good | Somewhat poor | |

EXAMPLE 25

25 parts of oligomer K and 40 parts of oligomer Z were dissolved in 25 parts of styrene and 5 parts of NK-Ester-14G and 5 parts of 2-hydroxyethyl acrylate, and 3 parts of Percumyl H (trademark for cumene hydroperoxide, a product of Nippon Yushi Kabushiki Kaisha), 0.3 part of dimethylaniline, 0.2 part of a 6% mineral spirit solution of cobalt naphthenate and a silicone-type levelling agent were added to form a coating composition. The resulting coating solution was coated in a thickness of about 30 to 40 microns on a Bonderized steel plate, and heated in air at 60° C. for 30 minutes. The properties of the resulting coating are shown in Table 12.

Comparative Example 29

Example 25 was repeated except that 25 parts of pentaerythritol diallyl ether was used instead of 25 parts of oligomer K. The properties of the resulting coating are shown in Table 12.

Table 12

| Properties | Example 25 | Comparative Example 29 |
|---|---|---|
| Resistance to toluene | Good | Somewhat good |
| Resistance to MEK | Good | Somewhat poor |
| Resistance to gasoline | Good | Somewhat good |
| Resistance to alkali | Somewhat good | Somewhat poor |
| Weather resistance | Good | Poor |

EXAMPLE 26

35 parts of oligomer M and 35 parts of oligomer X were dissolved in 10 parts of methyl methacrylate, 10 parts of styrene, 5 parts of 2-hydroxyethyl methacrylate and 5 parts of acrylic acid, and 3 parts of Permek N, 1 part of a 6% mineral spirit solution of cobalt naphthenate and a silicone-type levelling agent were added to form a coating composition. The resulting coating solution was coated in a thickness of about 30 to 40 microns on a "Bonderized" steel plate whose surface had been under coated with a wash primer in a thickness of about 3 microns. Then, the coating was heated in air at 50° C. for 1 hour. The properties of the resulting coating are shown in Table 13.

EXAMPLE 27

Example 26 was repeated except that oligomer A was used instead of oligomer M, and oligomer Y was used instead of oligomer X. The properties of the resulting coating are shown in Table 13.

Table 13

| Properties | Example 26 | Example 27 |
|---|---|---|
| Resistance to toluene | Good | Good |
| Resistance to MEK | Somewhat good | Somewhat good |
| Resistance to gasoline | Good | Somewhat good |
| Resistance to alkali | Somewhat good | Somewhat good |
| Weather resistance | Somewhat poor | Somewhat good |

EXAMPLE 28

25 parts of oligomer A and 25 parts of oligomer N were dissolved in 20 parts of 2-hydroxyethyl methacrylate, 20 parts of NK-Ester-14G (trademark for a product of Shin Nakamura Kagaku) and 10 parts of acrylic acid, and 0.2 parts of Permek N, 0.1 part of a 6% mineral spirit solution of cobalt naphthenate and a silicone-type levelling agent were added to form a coating composition. The resulting coating solution was coated in a thickness of about 30 to 40 microns on a Bonderized steel plate whose surface had been undercoated with a wash primer in a thickness of about 3 microns. The coating was heated in air at 50° C. for 1 hour. The properties of the resulting coating are shown in Table 14.

Comparative Example 30

Example 28 was repeated except that 50 parts of oligomer A alone was used instead of 25 parts of oligomer A and 25 parts of oligomer N. The properties of the resulting coating are shown in Table 14.

Comparative Example 31

Comparative Example 30 was repeated except that oligomer N was used instead of oligomer A, and the heating was performed in an atmosphere of nitrogen. The properties of the resulting coating are shown in Table 14.

Table 14

| Properties | Example 28 | Comparative Examples 30 | 31 |
|---|---|---|---|
| Cross-cut | 100/100 | 100/100 | 90/100 |
| Erichsen (mm) | 5 | 5 | 4 |
| Flexural resistance (mm) | 6 | 6 | 8 |
| Impact resistance (g/20 cm) | 500 | 500 | 500 |
| Pencil hardness | 2H | H | 2H |
| Resistance to toluene | Good | Somewhat poor | Good |
| Resistance to MEK | Somewhat good | Poor | Somewhat poor |
| Resistance to gasoline | Good | Good | Good |
| Resistance to alkali | Somewhat good | Somewhat good | Somewhat good |
| Weather resistance | Good | Somewhat poor | Somewhat good |

EXAMPLE 29

50 parts of oligomer B and 30 parts of oligomer N were dissolved in 20 parts of 2-hydroxyethyl methacrylate, and 0.2 part of Permek N, 0.1 part of a 6% mineral spirit solution of cobalt naphthenate and a silicone-type levelling agent were added to form a coating composition. The resulting coating solution was coated in a thickness of about 30 to 40 microns on a Bonderized steel plate, and heated in air at 50° C. for 2 hours. The properties of the resulting coating are shown in Table 15.

Comparative Example 32

Example 29 was repeated except that oligomer B alone was used in an amount of 80 parts instead of 50 parts of oligomer B and 30 parts of oligomer N. The properties of the resulting coating are shown in Table 15.

Comparative Example 33

Comparative Example 32 was repeated except that oligomer N was used instead of oligomer B, and the heating was carried out in an atmosphere of nitrogen. The results are shown in Table 15.

Table 15

| Properties | Example 29 | Comparative Examples 32 | Comparative Examples 33 |
|---|---|---|---|
| Resistance to toluene | Good | Somewhat good | Somewhat good |
| Resistance to MEK | Somewhat good | Somewhat poor | Somewhat good |
| Resistance to gasoline | Good | Good | Good |
| Resistance to alkali | Somewhat poor | Poor | Poor |
| Weather resistance | Somewhat good | Somewhat poor | Somewhat good |

EXAMPLE 30

20 parts of oligomer H and 20 parts of oligomer O were dissolved in 25 parts of styrene, 25 parts of NK-Ester-M9G (trademark for a product of Shin Nakamura Kagaku), and 10 parts of acrylic acid, and 0.2 part of Permek N, 0.1 part of a 6% mineral spirit solution of cobalt naphthenate and a silicone-type levelling agent were added to form a coating composition. The coating solution was coated on a mild steel plate whose surface had been polished with a sand paper (No. 320) and treated with trichloroethylene, in a thickness of about 30 to 40 microns. The coating was heated in air at 50° C. for 1 hour. The properties of the coating are shown in Table 16.

Comparative Example 34

Example 30 was repeated except that 40 parts of oligomer H alone was used instead of 20 parts of oligomer H and 20 parts of oligomer O. The properties of the coating obtained are shown in Table 16.

Comparative Example 35

Comparative Example 34 was repeated except that oligomer O was used instead of oligomer H, and the heating was performed in an atmosphere of nitrogen. The properties of the resulting coating are shown in Table 16.

Table 16

| Properties | Example 30 | Comparative Examples 34 | Comparative Examples 35 |
|---|---|---|---|
| Resistance to toluene | Good | Somewhat poor | Somewhat good |
| Resistance to MEK | Somewhat good | Poor | Somewhat good |
| Resistance to gasoline | Good | Good | Good |
| Resistance to alkali | Somewhat poor | Somewhat good | Poor |
| Weather resistance | Somewhat good | Poor | Somewhat poor |

EXAMPLE 31

30 parts of oligomer I and 20 parts of oligomer T were dissolved in 20 parts of 2-hydroxyethyl methacrylate, 20 parts of NK-Ester-M9G and 10 parts of acrylic acid, and 0.2 part of Permek N, 0.1 part of 6% mineral spirit solution of cobalt naphthenate and a silicone-type levelling agent were added to form a coating composition. The resulting coating solution was coated in a thickness of about 30 to 40 microns on a Bonderized steel plate whose surface had been undercoated with a wash primer in a thickness of about 3 microns. The coating was heated in air at 50° C. for 2 hours. The properties of the coating are shown in Table 17.

Comparative Example 36

Example 31 was repeated except that 50 parts of oligomer I alone was used instead of 30 parts of oligomer I and 20 parts of oligomer T. The properties of the resulting coating are shown in Table 17.

Comparative Example 37

Comparative Example 36 was repeated except that 50 parts of oligomer T was used alone instead of oligomer I, and the heating was carried out in an atmosphere of nitrogen. The properties of the resulting coating are shown in Table 17.

Table 17

| Properties | Example 31 | Comparative Examples 36 | Comparative Examples 37 |
|---|---|---|---|
| Resistance to toluene | Good | Somewhat good | Somewhat good |
| Resistance to MEK | Somewhat good | Somewhat poor | Somewhat good |
| Resistance to gasoline | Good | Good | Somewhat good |
| Resistance to alkali | Somewhat good | Somewhat poor | Somewhat poor |
| Weather resistance | Somewhat good | Poor | Somewhat poor |

What we claim is:

1. A liquid in air-curable resin composition comprising

A. an unsaturated oligomer having a number average molecular weight of 500 to 4000 and containing at the end of the molecule at least two member selected from the group consisting of acryloyl and methylacryloyl groups, and at least one ethylenically unsaturated double bond in the oligomer chain which oligomer is expressed by the following formula:

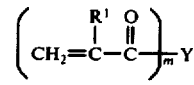

wherein $R^1$ is a hydrogen atom or a methyl group, Y represents an ethylenically unsaturated polyepoxide or polyester oligomer residue containing up to 15 acyl structural units derived from ethylenically unsaturated monomers bonded to each other through —O— or —COO—, and $m$ is a number of from 2 to 10 and B. an oligomer having a number average molecular weight of 500 to 4000 which contains at the ends of the molecule at least two member selected from a group conssiting of acryloyl and methacryloyl groups, and at least one pendant allyloxy group in the oligomer chain, said oligomer having an allyloxy group equivalent of not more than 500 and being free from an ethylenic internal double bond in the oligomer chain, said oligomer being expressed by the following formula

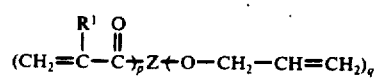

wherein $R^1$ is a hydrogen atom or a methyl group, Z represents an oligomer residue defined as Y but not containing an ethylenic internal double bond, p is a number of from 2 to 10, and q is a number of from 1 to 15, the weight ratio of (A) to (B) being 8:2 to 2:8.

2. The in-air curable resin composition of claim 1 wherein components (A) and (B) are oligoesters.

3. The in-air curable resin composition of claim 1 wherein said composition comprises:

A. a fumaroyl group-containing unsaturated oligoester methacrylate having a number average molecular weight of 1500 and containinig at least two methacryloyl groups at the ends of the molecule and 6 fumaroyl groups, and B. an oligoester methacrylate having a number average molecular weight of 1600 and containing at least two methacryloyl groups at the ends of the molecule with an allyloxy group equivalent of 310, said oligomers (A) and (B) being present in the weight ratio of 4:6.

4. The composition of claim 1 wherein said unsaturated oligomer residue Y is an unsaturated oligoester residue.

5. The composition of claim 1 wherein said ethylenically unsaturated polyester is derived from a polycarboxylic acid which is a dicarboxylic acid containing one ethylenic double bond and 4 to 10 carbon atoms.

6. The composition of claim 1 wherein said ethylenically unsaturated polyester is derived from a polycarboxylic acid which is an ethylenically unsaturated dicarboxylic acid selected from the group consisting of maleic acid, maleic anhydride, fumaric acid, itaconic acid, tetrahydrophthalic acid, 3,6-endomethylene-$\Delta^4$-tetrahydrophthalic anhydride and hexachloro-3,6-endomethylene-$\Delta^4$-tetrahydrophthalic anhydride.

7. The composition of claim 1 wherein said unsaturated oligomer (A) contains 2 to 10 ethylenic internal double bonds.

8. The composition of claim 1 wherein said unsaturated oligomer (A) has a number average molecular weight of 700 to 2,500.

9. The composition of claim 1 wherein said unsaturated oligomer (A) contains 2 to 6 acryloyl or methacryloyl groups.

10. The composition of claim 1 wherein said oligomer (B) contains 2 to 10 allyloxy groups.

11. The composition of claim 1 wherein said oligomer (B) contains 2 to 6 acryloyl or methacryloyl groups.

12. The composition of claim 1 wherein the oligomer residue Z is an oligoester residue free from an ethylenic internal double bond.

13. The composition of claim 1 wherein said oligomer (B) has a number average molecular weight of 700 to 2,500.

14. The composition of claim 1 wherein said oligomer (B) has an allyloxy group equivalent of 200 to 500.

15. The composition of claim 1 which further comprises 0.5 to 200% by weight, based on the total weight of the unsaturated oligomer (A) and the oligomer (B), of a polymerizable monomer.

16. The composition of claim 15 wherein said polymerizable monomer is a vinyl monomer.

17. The composition of claim 16 wherein said vinyl monomer is selected from the group consisting of styrene, styrene derivatives, acrylic acid, methacrylic acid and ester of acrylic acid or methacrylic acid.

18. The composition of claim 1 which is a solventless coating composition.

* * * * *